April 24, 1956 R. A. KRAFT 2,743,364

SYNCHRONIZED SCANNING GENERATOR

Filed March 17, 1953 2 Sheets-Sheet 1

INVENTOR.
Richard A. Kraft
BY Norman L. Mueller
Atty.

April 24, 1956 R. A. KRAFT 2,743,364

SYNCHRONIZED SCANNING GENERATOR

Filed March 17, 1953 2 Sheets-Sheet 2

INVENTOR.
Richard A. Kraft
BY Foorman L. Mueller
Atty.

2,743,364

SYNCHRONIZED SCANNING GENERATOR

Richard A. Kraft, Chicago, Ill., assignor to Motorola, Inc., Chicago, Ill., a corporation of Illinois Application March 17, 1953, Serial No. 342,805

5 Claims. (Cl. 250—36)

Figures 1, 5:
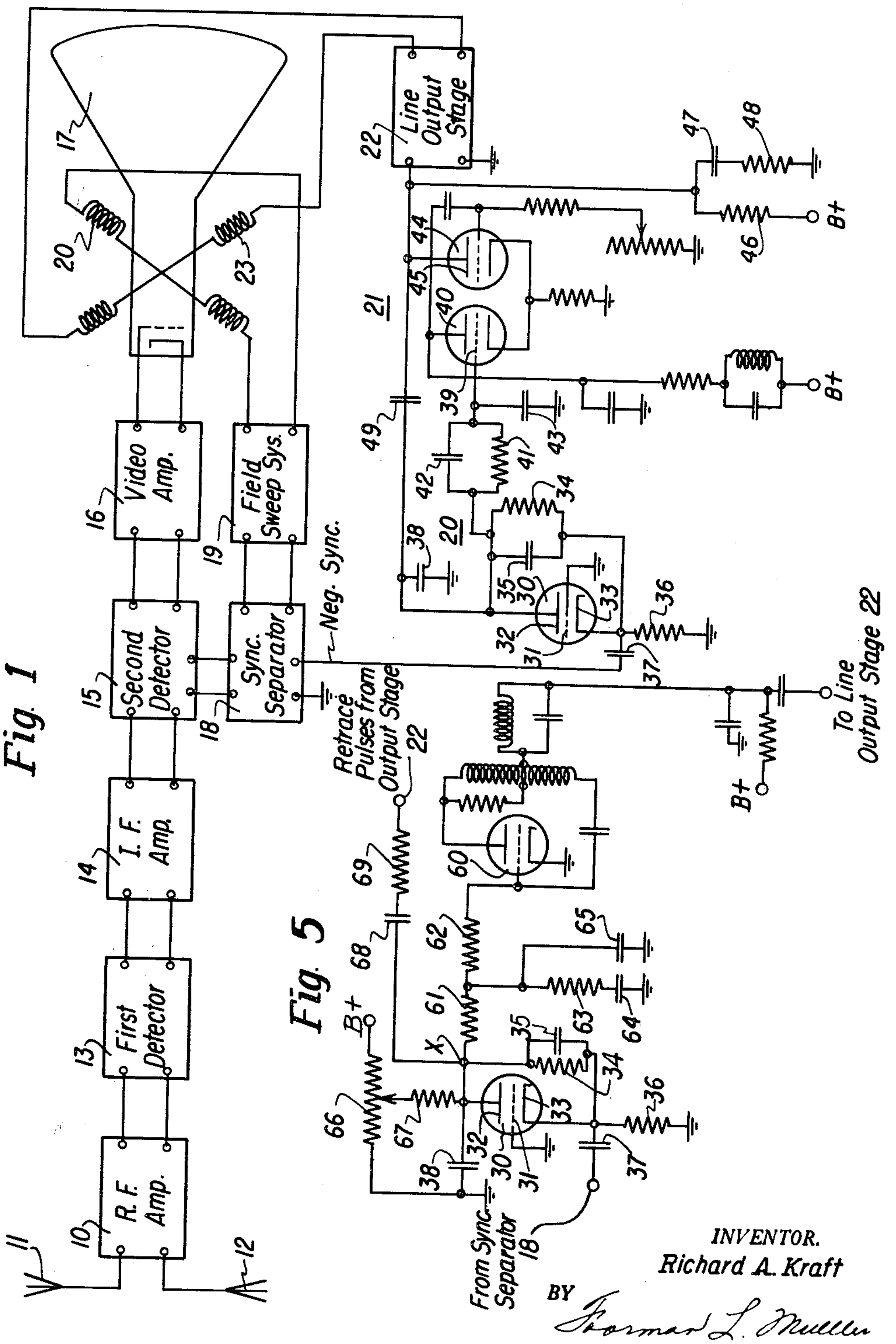

This invention relates to television receivers, and more particularly to an improved and simplified control circuit for use in a television receiver for effecting synchronization between the receiver image reproducer and an incoming television signal.

It is usual practice in present-day television receivers to provide an automatic frequency control circuit using the phase detector principle for synchronizing the line scanning generator or oscillator of the receiver with the line synchronizing components of incoming television signals. Such control circuit compares the phase of the output signal of the scanning oscillator with the line synchronizing pulses of a received television signal to produce a control voltage, and the control voltage is used to synchronize the oscillator with the received television signal.

Control circuits of the above type are relatively immune to noise disturbances, and synchronism is not entirely destroyed even during intervals when the synchronizing pulses become lost in background noise. These features are realized since the control exerted by the control circuit on the scanning oscillator depends upon the repetition of many regularly occurring pulses, and single or random bursts of energy have little effect thereon. These circuits are generally well known to the art and usually comprise a pair of diodes connected so that a balanced condition exists to provide a minimum response to random noise bursts, and to maintain reference control voltage in the absence of synchronizing pulses so that the control circuit does not tend to shift the oscillator from the synchronous frequency during intervals when this condition occurs. It has been found, however, that circuits incorporating a pair of diodes are relatively complicated and expensive, and many attempts have been made to devise such a control circuit utilizing but a single triode rather than a pair of diodes.

Triode automatic frequency control circuits for line synchronization have been successfully constructed, and such circuits have proved to be less complicated and expensive than the above-mentioned double diode circuit. However, in most triode automatic frequency control circuits, the balance effect of the two diodes is lost so that, even though the triode circuits are less expensive, they do not compare in performance with the previous type of circuit. Attempts have been made successfully to construct an automatic frequency control circuit for line synchronization in which a single triode is connected to constitute a balanced phase detector. However, this balanced feature has been achieved heretofore only by use of added components and additional circuitry.

It is an object of the present invention to provide an improved control circuit for use in a television receiver using a single triode and which is highly immune to noise disturbances and may be constructed simply, inexpensively and expeditiously.

A more general object of the invention is to provide a new, improved and simplified synchronization automatic frequency control circuit for use in a television receiver.

A further object of the invention is to provide a balanced phase detector for a television receiver constructed in an improved and simplified manner, and which incorporates a single triode discharge device.

A still further object of the invention is to provide such an improved automatic frequency control circuit for use in a television receiver which is capable of controlling both the blocking oscillator and multivibrator type of scanning oscillators.

A feature of the invention is the provision of a synchronization automatic frequency control circuit including a triode discharge device having a grounded control electrode, which is constructed so that a control voltage varying in amplitude and polarity with respect to ground or reference potential is obtained from the anode for application to the line scanning oscillator, and in which noise disturbances are balanced out for most conditions in various sections of the triode.

Figure 4:
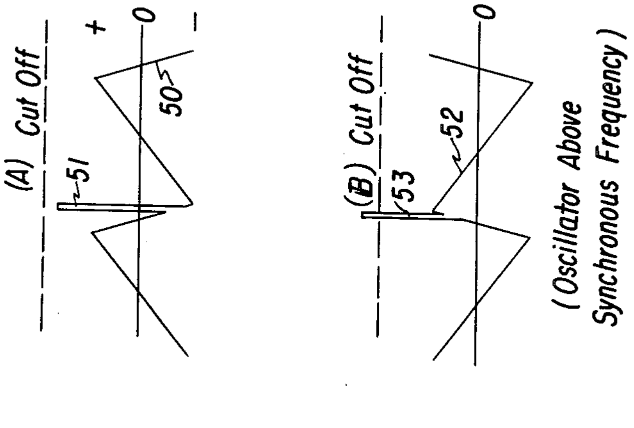
Figure 3:
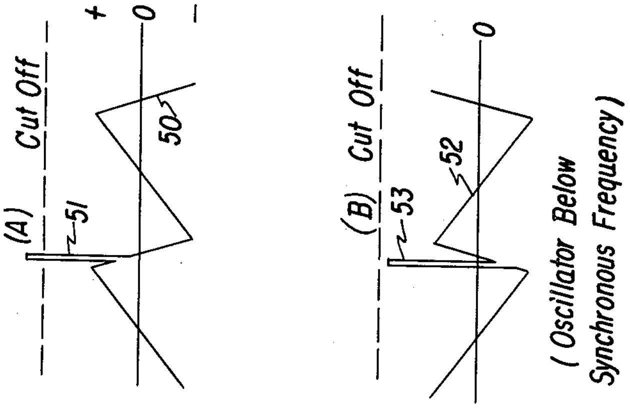
Figure 2:
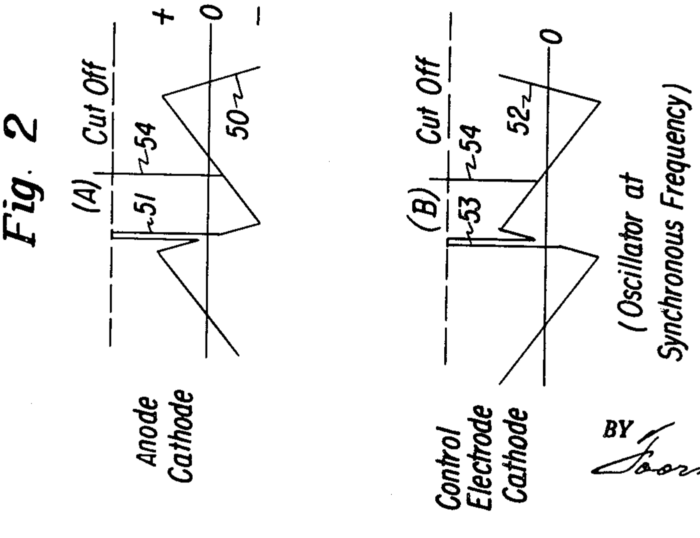

The above and other features of the invention which are believed to be new are set forth with particularity in the appended claims. The invention itself, however, together with further objects and advantages thereof may best be understood by reference to the following description when taken in conjunction with the accompanying drawings in which:

Fig. 1 is a television receiver incorporating the invention,

Figs. 2–4 comprise various curves useful in explaining the invention, and

Fig. 5 is a fragmentary diagram of a modification of the invention.

The present invention provides a control circuit for a television receiver for synchronizing a scanning oscillator therein with the synchronizing components of a received television signal. The control circuit includes an electron discharge device having an anode, a cathode and a control electrode, the latter being connected to a point of reference potential or ground. A voltage-divider time-constant network is connected between the anode and ground with an intermediate tap thereon connected to the cathode. Means is provided for supplying negative-going synchronizing pulses to the cathode, and further means is provided for deriving an alternating-current signal having a frequency corresponding to the frequency of the oscillator and for supplying such signal to the anode of the aforementioned electron discharge device. Finally, means is coupled to the anode for deriving a control voltage varying in amplitude and polarity with respect to the aforementioned reference potential and for supplying such control voltage to the oscillator to control the frequency thereof.

The television receiver of Fig. 1 includes a radio frequency amplifier 10 of any desired number of stages having input terminals connected to an antenna circuit 11, 12, and having output terminals connected to a first detector or converter 13. First detector 13 is coupled to an intermediate frequency amplifier 14 of one or more stages, and the output terminals of the intermediate frequency amplifier are connected to a second detector 15. Second detector 15 is coupled through a video amplifier 16 to the input electrodes of a cathode-ray image reproducing device 17.

Second detector 15 is also connected to a synchronizing signal separator 18; and the latter unit has output terminals connected to a field sweep system 19 which, in turn, is coupled to the field deflection elements 20 of reproducing device 17. Separator 18 is also coupled to a line scanning oscillator or generator 21 through an automatic frequency control circuit constructed in accordance with the invention and designated generally as 20. The line scanning oscillator is coupled through a line output amplifier stage 22 to the line deflection elements 23 of reproducing device 17.

The sound portion of the television receiver forms no part of the present invention and, for that reason, has not been shown.

When the receiver is tuned to a television signal intercepted by antenna circuit 11, 12; such a television signal is amplified in radio frequency amplifier 10 and heterodyned to the selected intermediate frequency of the receiver in first detector 13. The resulting intermediate frequency signal is amplified in intermediate frequency amplifier 14 and demodulated in second detector 15. Second detector 15 produces a composite video signal which includes the video or picture components of the received television signal and also the line and field synchronizing components thereof. The composite video signal is amplified in video amplifier 16 and applied to the input electrodes of reproducing device 17 to modulate the cathode-ray beam therein in accordance with the picture intelligence on a manner well understood in the art.

The line and field synchronizing components of the television signal are separated therefrom in synchronizing signal separator 18, and the field synchronizing components are applied to field sweep system 19 to synchronize the field sweep system and, therefore, the field deflection of the cathode-ray beam in reproducing device 17 with the incoming television signal.

The line synchronizing components of separator 18 are applied to control circuit 20 in which they are compared with a sawtooth signal derived from oscillator 21, to synchronize the frequency of the oscillator with the received television signal. The output signal from oscillator 21 is amplified in output stage 22 and applied to the line deflection elements 23 so that the line deflection of the cathode-ray beam in reproducing device 17 may, likewise, be synchronized with the incoming television signal.

In the above described manner, the cathode-ray beam in reproducer 17 is modulated in accordance with the picture intelligence of the received television signal, and has its line and field deflections synchronized with the received television signal. The reproducing device, accordingly, may accurately reproduce the televised scene on its reproducing screen.

Control circuit 20 includes an electron discharge device 30 which has a control electrode 31 connected to a point of reference potential or ground, and which also has an anode 32 and a cathode 33. Anode 32 is connected to cathode 33 through a time-constant network including a resistor 34 shunted by a capacitor 35, and cathode 33 is connected to ground through a resistor 36 which, preferably, has a value equal to the value of resistor 34. Separating circuit 18 supplies negative-going line-synchronizing pulses to cathode 33 through a capacitor 37 which, preferably, has a value equal to the value of capacitor 35 and which, in conjunction with resistor 36, forms a time-constant network having a time-constant equal to that of network 34, 35.

Anode 32 is coupled to ground through a by-pass capacitor 38 which has a value sufficiently large to bypass the line-synchronizing pulses and also any video or high frequency noise components of the television signal that might reach the control circuit 20 from separator 18. Anode 32 is also coupled to the control electrode 39 of an electron discharge device 40 included in oscillator 21; such coupling being effectuated through a filter network which includes a series resistor 41 shunted by a capacitor 42, and which also includes a capacitor 43 connected between control electrode 39 and ground.

Scanning oscillator 21, in the illustrated embodiment, is a well-known multivibrator circuit and includes electron discharge devices 40 and 44. The anode 45 of discharge device 44 is connected to the positive terminal B+ of a source of unidirectional potential through a load resistor

46, and the anode is coupled to ground through a discharge capacitor 47 and series-connected peaking resistor 48. The anode 45 is further connected to an input terminal of line output stage 22, and through coupling capacitor 49 to the anode 32 of discharge device 30.

Oscillator 21 develops in well-known manner a peaked sawtooth wave across discharge condenser 47 and peaking resistor 48, and this sawtooth wave is fed to the anode 32 of discharge device 30 through coupling capacitor 49. Resistors 34 and 36 constitute a potential divider between anode 32 and ground, and the common junction of these resistors which constitutes an intermediate tap on the potentiometer is connected to cathode 33. This produces a sawtooth voltage wave between cathode 33 and ground, and also produces an in phase sawtooth voltage wave between anode 32 and cathode 33 of the same amplitude. Synchronizing signal separator 18, on the other hand, supplies negative-going synchronizing pulses to cathode 33 which, in conjunction with the sawtooth waves, produces a control voltage at anode 32 for controlling the frequency of oscillator 21.

When it is assumed that the oscillator 21 is operating at its proper synchronous frequency, the condition shown in the curves of Fig. 2 applies. Under this condition, the potential from anode to cathode is represented in Fig. 2A by the sawtooth voltage wave 50 with the positive-going synchronizing pulse 51 pedestaled thereon, the synchronizing pulse being positive insofar as the anode is concerned since it is impressed with negative polarity on the cathode. Likewise, as shown in Fig. 2B, the in-phase sawtooth wave impressed on cathode 53 by the voltage divider 35, 36 may be represented by the sawtooth wave 52 on the control electrode 31 opposite in phase to sawtooth wave 50. Moreover, sawtooth wave 52 has a positive-going synchronizing pulse 53 pedestaled thereon corresponding to the negative-going synchronizing pulse applied to the cathode.

So long as the oscillator frequency remains synchronized with the incoming synchronizing pulses, the condition shown in the curves of Figs. 2A and 2B obtains, with the peaks of synchronizing pulses 51 and 53 extending to the cutoff level of discharge device 30, but not exceeding this level. Discharge device 30 is, therefore, non-conductive during this condition and zero control voltage is applied to oscillator 21.

Should the frequency of oscillator 21 fall below synchronous frequency, the condition shown in the curves of Figs. 3A and 3B arises. Under the latter condition, the phase between the sawtooth wave 50 and synchronizing pulse 51 is changed so that the synchronizing pulse rises on the sawtooth wave and its peak extends beyond anode current cutoff for discharge device 30 causing the discharge device to conduct anode current. At the same time, synchronizing pulse 53 rides down the slope of sawtooth wave 52 to fall below the grid current cutoff level of the discharge device.

Conduction of discharge device 30 by the peaks of synchronizing pulses 51 causes a voltage drop across time-constant network 34, 35 and, since there is no conduction between cathode 33 and control electrode 31, there is no conduction through resistor 36 so that the lower point on time-constant network 34, 35 is at ground. Therefore, anode 32 is driven negative with respect to ground and develops a control voltage by virtue of the integrating action of time-constant network 34, 35 on the peaks of synchronizing pulses 51. The control voltage is filtered in filter network 41—43 and biases control electrode 39 in a direction to speed up the frequency of oscillator 21 to recover the synchronous condition of Fig. 2.

On the other hand, should the frequency of oscillator 21 increase so as to be in excess of synchronous frequency, the condition shown in Fig. 3 obtains. Under this latter condition, synchronizing pulse 51 slides down the slope of sawtooth wave 50 so that its peak is below anode current cutoff of discharge device 30. Synchronizing pulse 53, on the other hand, moves upwardly on the slope of sawtooth wave 52 so that its peak exceeds grid current cutoff causing current to flow between cathode 33 and control electrode 31. Such current flow produces a positive potential across time-constant network 33, 37 to produce a control voltage which is positive with respect to ground. Since there is no current flowing between anode 32 and cathode 33, there is no drop across time-constant network 34, 35 and the positive voltage from time-constant network 36, 37 is applied to the filter network 41—43 to reduce the frequency of oscillator 21 to re-establish the condition shown in Fig. 2.

Discharge device 30, therefore, functions in a manner similar to a pair of diodes, one of the diodes being formed by the plate and cathode of the device, and the other by the grid and cathode thereof.

Capacitor 38 as previously noted is made sufficiently large to bypass the synchronizing pulses to ground and also any video or noise components supplied to the control circuit by synchronizing signal separator 18, so that these signals do not appear in the output of the control circuit and immunity from high frequency noise is assured. It is to be noted that a low frequency burst of high amplitude noise 54 accompanying the synchronizing pulses from separator 18, is pedestaled on the sawtooth waves 50 and 52 and, although such burst tends to establish a positive voltage across time-constant network 36, 37; the burst also tends to establish a negative voltage across time-constant network 34, 35 so that the effect of such noise is essentially balanced, in the same manner as in the more complicated double diode phase detectors of the prior art. Moreover, continuous noise accompanying the synchronizing pulses, if not by-passed by capacitor 38 is balanced almost completely by the control circuit of the invention since it produces substantially equal and opposite voltages across the time constant networks during each cycle of the sawtooth wave in the same manner as in a double diode arrangement.

In the modification of Fig. 5, it is assumed that scanning oscillator 21 is a blocking oscillator including an electron discharge device 60. Difficulties have been encountered in controlling a blocking oscillator by a control voltage that varies positively and negatively on a zero potential axis, because the control electrode of the blocking oscillator discharge device is biased negatively during operation of the blocking oscillator. This control may be effectuated with the automatic frequency control circuit of the invention, however, in the following manner. The control electrode of discharge device 60 is directly connected to the anode 32 of discharge device 30 through a filter and biasing network which comprises a pair of series-connected resistors 61 and 62, and which also comprises a series-connected resistor 63 and capacitor 64 connected between the junction of resistors 61, 62 and ground and shunted by a capacitor 65. Anode 32 is connected to a tap on a potentiometer 66 through a resistor 67, the potentiometer being connected between the positive terminal B+ and ground. In the latter embodiment, the sawtooth waves for discharge device 30 may be obtained in well-known manner by integrating through network 68 and 69 retrace pulses derived from output stage 22. These retrace pulses may also be integrated to constitute the sawtooth waves for control circuit of Fig. 1 if so desired.

In the embodiment of Fig. 5, the movable tap on potentiometer 66 is adjusted to provide a countervoltage against the negative bias normally developed on the control electrode of discharge device 60 so that under usual operating conditions, point X is established at zero or ground potential, whereas the control electrode of device 60 is maintained at a negative potential by the biasing and filter network 61—65 for proper operation of the blocking oscillator. The control circuit then operates in an identical manner to that of Fig. 2, with a control voltage being established at point X which varies in amplitude and polarity with respect to ground depending upon the amount and sense of the frequency deviation of blocking oscillator 60 which causes a control voltage to be applied to the control electrode of device 60 having appropriate amplitude variations on a negative axis to control the frequency of the blocking oscillator.

The invention provides, therefore, an improved and simplified synchronizing control circuit of the phase detector type. The control circuit utilizes but a single triode connected in a simplified and expeditious manner, and yet which provides a balanced automatic frequency control with the same characteristic as the more complicated prior art double diode control circuits.

While particular embodiments of the invention have been shown and described, modifications may be made, and it is intended in the appended claims to cover all such modifications as fall within the true spirit and scope of the invention.

I claim:

1. A control circuit for use in a television receiver for synchronizing a scanning generator therein with negative-going synchronizing pulses derived from a television signal received by the receiver, said control circuit including in combination, an electron discharge device having an anode, a cathode and a control electrode; a connection for establishing said control electrode at a reference potential; a voltage-divider time-constant network connected between said anode and a point of said reference potential and having an intermediate tap connected to said cathode; means for supplying the aforesaid negative-going synchronizing pulses to said cathode; means for deriving an alternating-current signal having a frequency corresponding to the frequency of the aforesaid scanning generator and for supplying such signal to said anode; and means coupled to said anode for deriving a control voltage varying in amplitude and polarity with respect to the aforesaid reference potential and for supplying such control voltage to the scanning generator to control the frequency thereof.

2. A control circuit for use in a television receiver for synchronizing a scanning generator therein with negative-going synchronizing pulses derived from a television signal received by the receiver, said control circuit including in combination, an electron discharge device having an anode, a cathode and a control electrode; a connection for establishing said control electrode at ground potential; a voltage-divider time-constant network including a pair of resistors connected between said anode and a point of ground potential with the common junction of said resistors connected to said cathode; means for supplying the aforesaid negative-going synchronizing pulses to said cathode; means for deriving a sawtooth wave from the aforesaid scanning generator and for supplying such wave to said anode; and a filter network coupled to said anode for deriving a control voltage varying in amplitude and polarity with respect to ground and for supplying such control voltage to the scanning generator to control the frequency thereof.

3. A control circuit for use in a television receiver for synchronizing a scanning generator therein with negative-going synchronizing pulses derived from a television signal received by the receiver, said control circuit including in combination, an electron discharge device having an anode, a cathode and a control electrode; a connection for establishing said control electrode at a reference potential; first and second time-constant networks respectively connected between said anode and cathode, and between said cathode and a point of said reference potential; means for supplying the aforesaid negative-going synchronizing pulses to said cathode; a by-passing capacitor connected between said anode and said point of reference potential; means for deriving a sawtooth wave from said scanning generator and for supplying such wave to said anode; and means coupled to said anode for deriving a control voltage varying in amplitude and polarity with respect to the aforesaid reference potential and for supplying such control voltage to the scanning generator to control the frequency thereof.

4. A control circuit for use in a television receiver for synchronizing a scanning generator therein with negative-going synchronizing pulses derived from a television signal received by the receiver, said control circuit including in combination, an electron discharge device having an anode, a cathode and a control electrode; a connection for establishing said control electrode at ground potential; a first resistor connecting said anode to said cathode; a capacitor shunting said first resistor to form a time-constant network; a second resistor connecting said cathode to ground and having a value equal to the value of said first resistor; means including a capacitor for supplying the aforesaid negative-going synchronizing pulses to said cathode, said last-mentioned capacitor and said second resistor forming a time-constant network of equal value to said first-mentioned time-constant network; a by-passing capacitor connected between said anode and ground; means for deriving a sawtooth wave from the aforesaid scanning generator and for supplying such wave to said anode; and means coupled to said anode for deriving a control voltage varying in amplitude and polarity with respect to ground and for supplying such control voltage to the scanning generator to control the frequency thereof.

5. A control circuit for use in a television receiver for synchronizing a scanning generator therein with negative-going synchronizing pulses derived from a television signal received by the receiver, said control circuit including in combination, an electron discharge device having an anode, a cathode and a control electrode; a connection for establishing said control electrode at a reference potential; a voltage divider network connected between said anode and a point of said reference potential and having an intermediate tap connected to said cathode; means for supplying the aforesaid negative-going synchronizing pulses to said cathode; means for deriving an alternating-current signal from the aforesaid scanning generator and for supplying such signal to said anode; a by-passing capacitor connected between said anode and said point of reference potential; a filter and biasing network connected from said anode to the scanning generator for establishing a negative bias in the generator and for supplying a control voltage from said anode to the scanning generator to control the frequency thereof and constituting a direct resistance path from said anode to the generator; and a network for applying a positive potential to said anode to establish the axis of the control voltage at said anode at the aforesaid reference potential.

References Cited in the file of this patent

UNITED STATES PATENTS

| | | |
|---|---|---|
| 2,141,343 | Campbell | Dec. 27, 1938 |
| 2,503,700 | Barco | Apr. 11, 1950 |
| 2,598,370 | Gruen | May 27, 1952 |